US012494005B2

United States Patent
Pedersen et al.

(10) Patent No.: US 12,494,005 B2
(45) Date of Patent: Dec. 9, 2025

(54) TECHNIQUES FOR GENERATING DYNAMIC CONTENT

(71) Applicant: Google LLC, Mountain View, CA (US)

(72) Inventors: Zebedee Pedersen, Hove East Sussex (GB); Luis De Jorge Ladrero, London (GB); Marta Soto Morras, London (GB); Kathryn Jane Strudwick, London (GB)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 18/389,601

(22) Filed: Dec. 19, 2023

(65) Prior Publication Data
US 2024/0203006 A1 Jun. 20, 2024

Related U.S. Application Data

(60) Provisional application No. 63/433,610, filed on Dec. 19, 2022.

(51) Int. Cl.
*G06T 11/60* (2006.01)
*G06F 16/53* (2019.01)

(52) U.S. Cl.
CPC .............. *G06T 11/60* (2013.01); *G06F 16/53* (2019.01); *G06T 2200/24* (2013.01)

(58) Field of Classification Search
CPC ....................................................... G06T 11/60
See application file for complete search history.

(56) References Cited

U.S. PATENT DOCUMENTS

| | | | |
|---|---|---|---|
| 9,082,092 B1 | 7/2015 | Henry | |
| 10,742,435 B2 | 8/2020 | Vuskovic et al. | |
| 11,816,577 B2 | 11/2023 | Park et al. | |
| 2019/0012581 A1* | 1/2019 | Honkala | G06V 10/758 |
| 2023/0060097 A1* | 2/2023 | Knuffman | G06T 5/77 |
| 2023/0112921 A1 | 4/2023 | Cai et al. | |
| 2025/0095224 A1* | 3/2025 | Malpani | G06T 11/00 |
| 2025/0209113 A1* | 6/2025 | Joseph Stephen Max | G06F 16/532 |

OTHER PUBLICATIONS

StorySynth.org, "StorySynth", retrieved on Apr. 8, 2025, https://storysynth.org/, 7 pages.

* cited by examiner

*Primary Examiner* — Shivang I Patel
(74) *Attorney, Agent, or Firm* — DORITY & MANNING P.A.

(57) ABSTRACT

A computer-implemented method for generating dynamic content. The method can include receiving, from an output of one or more machine-learned models, a first generated image. The first generated image can be generated based on a user query. Additionally, the method can include processing the first generated image, using the one or more machine-learned models, to determine a plurality of objects in the first generated image. Moreover, the method can include determining, using the one or more machine-learned models, a subset of actions associated with a first object in the plurality of objects. Furthermore, the method can include receiving a user input selecting a first action from the subset of actions associated with the first object. Subsequently, the method can include modifying the first object in the first generated image in response to the selection of the first action.

20 Claims, 15 Drawing Sheets

WOBBLE WAS A VERY WIGGLY WORM. HE LOVED TO WRIGGLE AROUND IN THE MUD AND DIRT, AND HE WAS VERY GOOD AT IT. SALLY WAS A SNEAKY SNAKE. SHE LOVED TO HIDE IN THE GRASS AND JUMP OUT AT PEOPLE.

ONE DAY, WOBBLE WAS WRIGGLING AROUND IN THE MUD WHEN HE HEARD A VOICE. HE LOOKED UP AND SAW A GIANT GENIE. THE GENIE WAS VERY OLD AND HAD A LONG WHITE BEARD. HE TOLD WOBBLE THAT HE HAS A WISH FOR HIM. "WIGGLY WORMS ARE VERY GOOD AT DIGGING, SO I WISH THAT YOU WOULD DIG ME A VERY DEEP HOLE IN THE MUD." SAID THE GENIE.

FIG. 2C

TECHNIQUES FOR GENERATING DYNAMIC CONTENT

FIELD

The present disclosure relates generally to dynamic content. More particularly, the present disclosure relates to systems and methods for generating dynamic content having a plurality of objects that are able to perform different actions.

BACKGROUND

Computing devices can include components capable of providing dynamic content, such as image content, video content, and/or accompanying audio content to the user(s) of the computing device. For instance, dynamic content can be or can include time-varying visual and/or audio signals that are provided to the user for entertainment and/or information. The dynamic content can be provided, for example, by a display screen and/or audio playback device.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating dynamic content can include receiving from an output of one or more machine-learned models, a first generated image. The first generated image can be generated based on a user query. Additionally, the method can include processing the first generated image, using the one or more machine-learned models, to determine a plurality of objects in the first generated image. Moreover, the method can include determining, using the one or more machine-learned models, a subset of actions associated with a first object in the plurality of objects. Furthermore, the method can include receiving a user input selecting a first action from the subset of actions associated with the first object. Subsequently, the method can include modifying the first object in the first generated image in response to the selection of the first action.

In some instances, the computing system can modify a second generated image in response to the selection of the first action, the second generated image being associated with the first generated image.

In some instances, the computing system can present the subset of actions that can be performed to the first object in response to a selection of the first object.

In some instances, the computing system can select the subset of actions from a larger set of actions based on a ranking score of each action in the larger set of actions.

In some instances, the subset of actions is being determined based on a characteristic of the first object.

In some instances, the generated image is generated by a machine-learned image generation model.

In some instances, the plurality of objects in the generated image are determined by a machine-learned image segmentation model. In some instances, the machine-learned image segmentation model is a generative adversarial network (GAN) model that processes the first generated image to determine the first object.

In some instances, a parameter of the one or more machine-learned model is modified based on the user input.

Another example aspect of the present disclosure is directed to a computer system for generating dynamic content. The system can include one or more processors and one or more non-transitory computer-readable media that collectively store instructions that, when executed by the one or more processors, cause the computing system to perform operations. The operations can include receiving, from an output of one or more machine-learned models, a first generated image, the first generated image being generated based on a user query. Additionally, the operations can include processing the first generated image, using the one or more machine-learned models, to determine a plurality of objects in the first generated image. Moreover, the operations can include determining, using the one or more machine-learned models, a subset of actions associated with a first object in the plurality of objects. Furthermore, the operations can include receiving a user input selecting a first action from the subset of actions associated with the first object. Subsequently, the operations can include modifying the first object in the first generated image in response to the selection of the first action.

Another example aspect of the present disclosure is directed to one or more non-transitory computer-readable media that collectively store instructions that, when executed by the one or more processors, cause a computing system to perform operations The operations can include receiving, from an output of one or more machine-learned models, a first generated image, the first generated image being generated based on a user query. Additionally, the operations can include processing the first generated image, using the one or more machine-learned models, to determine a plurality of objects in the first generated image. Moreover, the operations can include determining, using the one or more machine-learned models, a subset of actions associated with a first object in the plurality of objects. Furthermore, the operations can include receiving a user input selecting a first action from the subset of actions associated with the first object. Subsequently, the operations can include modifying the first object in the first generated image in response to the selection of the first action.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-2C depicts diagrams of an example user interface according to example embodiments of the present disclosure.

Figure 1A:
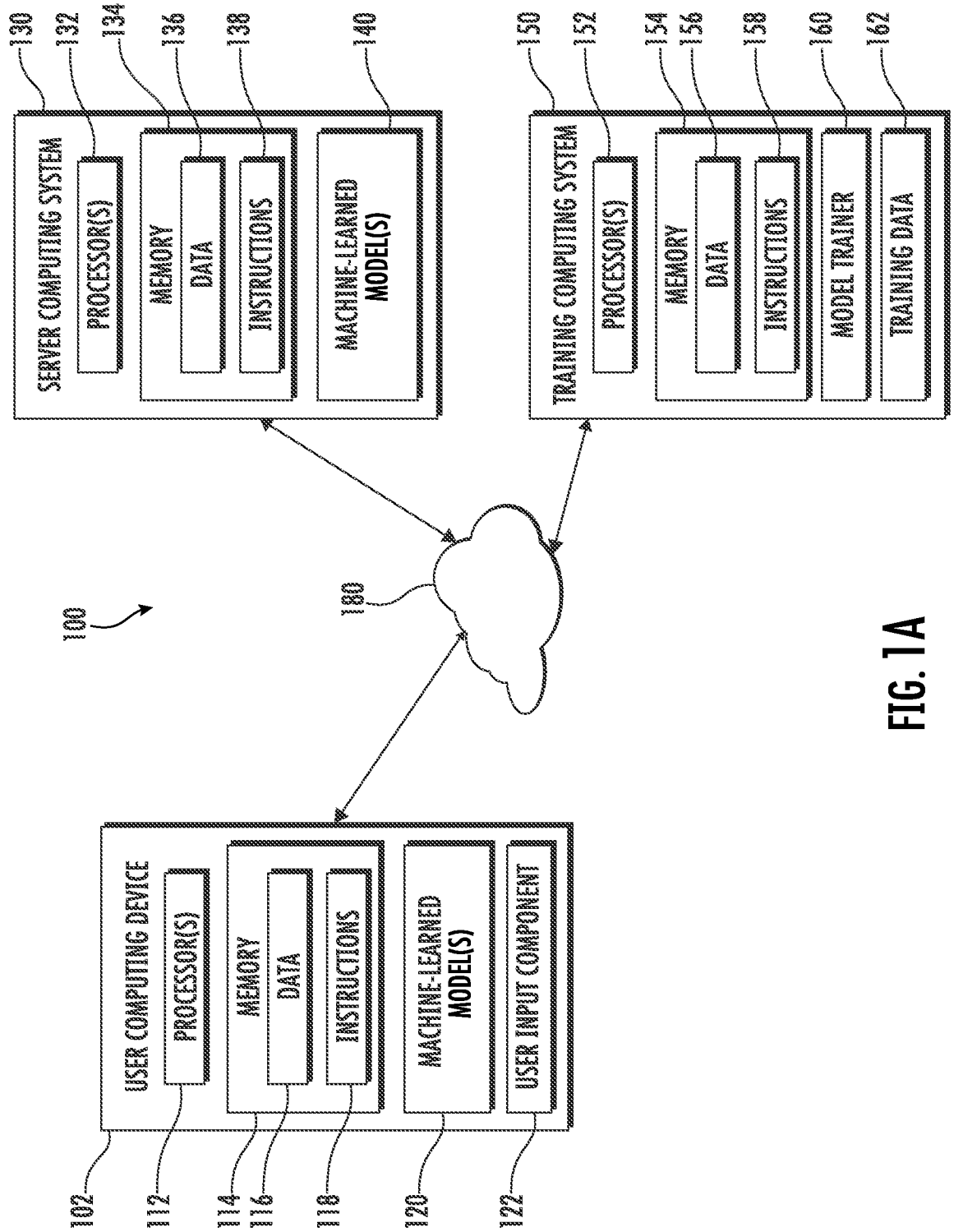
FIG. 1A depicts a block diagram of an example computing system that generates dynamic content according to example embodiments of the present disclosure.

Reference numerals that are repeated across plural figures are intended to identify the same features in various implementations.

DETAILED DESCRIPTION

Overview

Generally, the present disclosure is directed to systems and methods for generating and/or providing dynamic content. Dynamic content can include static and/or animated images, stickers, etc. that can graphically convey information to a user in a stylized manner. In some cases, the dynamic content may include and/or otherwise be provided with and/or without accompanying audio, such as music, sound effects, etc. The systems and methods described herein can provide contextual dynamic content appropriate for a user's context and/or actions that can increase user engagement and/or enjoyment. As another example, the dynamic content can be shared between users (e.g., in messaging applications) to provide for personalized communication. As another example, the dynamic content can be provided as part of an augmented reality experience. The dynamic content can be dynamically generated with regard to a plurality of machine-learned generated content (e.g., image), which can facilitate responsive and intelligent generation of dynamic content.

For instance, systems and methods according to example aspects of the present disclosure can provide dynamic content to users, which can engage users and increase their involvement with services providing the dynamic content. Systems and methods according to example aspects of the present disclosure, however, can provide for personalized content for every user query.

Example aspects of the present disclosure are directed to a computer-implemented method for generating and/or providing dynamic content, such as to increase user engagement with a service. In some embodiments, the computer-implemented method can be implemented by a computing system including one or more computing devices. As one example, a computing system can include one or more processors and one or more memory devices storing computer-readable instructions. The one or more processors can implement the computer-readable instructions to cause the one or more processors to perform operations of the computer-implemented method. As one example, the computing system can be or can include a client device, such as a mobile device (e.g., a smartphone, tablet computer, laptop computer, etc.) and/or a server computing system.

For instance, the operations and/or the computer-implemented method can include obtaining (e.g., by a computing system including one or more computing devices) a user query. In some embodiments, the user query can be obtained (e.g., from one or more user interfacing components) by a client computing device. For example, a client computing device can include one or more input components, such as buttons, microphones, keyboards, touch-sensitive screens and/or surfaces, cameras, etc., that are configured to receive user input and/or provide data associated with the user query in response to the user input.

Additionally and/or alternatively, the user query can be obtained by a server computing system. For example, the user query can be transmitted from a client computing device to a server computing system (e.g., by one or more network(s), such as 802.11 network(s), WiFi network(s), the Internet, etc.). The server computing system can receive the user query from the client computing device. In some embodiments, the user query may be compressed, anonymized, and/or otherwise preprocessed prior to being transmitted through the network. For example, the client computing device may transmit a condensed user query, such as a user query that includes at least data necessary for generating dynamic content and includes only a limited to no amount of extraneous data from the user query received at the client computing device.

The user query can be provided directly from a user, such as through a user input. For example, the user may directly input a message (e.g., text data) into a user input field and retrieve dynamic content based on the message. Additionally and/or alternatively, the user query may be provided indirectly from a user's actions. As one example, the user query can be or can include data that is obtained in response to a user input for a secondary function, such as opening an application, navigating to a webpage, performing an internet search, etc. For instance, any suitable user action may prompt generation and/or delivery of dynamic content in accordance with example aspects of the present disclosure.

As one example, the user query can be or can include text data, such as text data including one or more characters (e.g., ASCII characters). For example, the text data can be a string of characters. In some embodiments, the text data can be a message, such as a text message. For example, the message can be transmitted through a text messaging application, social media application, etc. For example, animated fonts and/or graphics can be generated based on the text data.

As another example, the user query can be or can include video data. For example, the user query may include video data captured by one or more cameras and/or other video capturing system(s) (e.g., in addition to accompanying audio data). As one example, the video data can be captured as part of an augmented reality (AR) system, such as a system for providing increased user interactivity with a user's surroundings. For example, the user query can include video data from an AR system and the dynamic content can be overlays for the video data.

In some instances, the system can generate a template from a plurality of candidate templates based at least in part on the user query. The template can include instructions for generating dynamic content. In some embodiments, the template can include one or more content items to be populated based at least in part on content data. For example, the template can include instructions for providing one or more content items, such as, for example, static images, animated images, sound effects and/or other audio clips, text items, graphics, color fills, and/or other suitable content items. For example, the template can include location, size (e.g., bounding boxes, scaling, maximum string size or character length, aspect ratio, etc.), font and/or other text style, image style, color(s) (e.g., color arrangements), content type, and/or any other suitable rules, specifications, and/or other information for each content item. The templates can be provided as computer-readable data such that dynamic content can be generated based on the templates and supplemental content data that describes how the template is filled out. The plurality of candidate templates can be defined by machine learning (e.g., classification).

In some instances, the system can obtain animation data based at least in part on the selected template and/or the content data. The animation data can be or can include data that is capable of being consumed by an animation player service such that dynamic content can be produced by the animation player service in response to receipt of the animation data. For example, in some embodiments, the animation data can be provided to an animation player service that is configured to receive the animation data and output dynamic content based on the animation data. For example, the dynamic content can realize animations, effects, fonts, formatting, etc. that is specified in the animation data.

In some instances, the user query can initiate a data-driven update of the dynamic content. For example, the user query may establish an initial request for dynamic content, and further updates to the dynamic content may be provided based on user intervention.

Systems and methods according to example aspects of the present disclosure can provide for a number of technical effects and benefits. As one example, systems and methods according to example aspects of the present disclosure can provide a user with dynamic content to increase user interactivity with a service. For example, a user can be drawn to information presented in the form of dynamic content as opposed to, for example, regularly formatted text, such that the user is more excited to consume information presented in the dynamic content. The dynamic content can be shared such that a user can encourage other users to view the dynamic content, which can increase user activity with the dynamic content.

Examples of the disclosure provide several technical effects, benefits, and/or improvements in computing technology and artificial intelligence techniques that involve the use of machine learning algorithms to auto-generate new data, such as image and video data. The techniques described herein improve the use of generative models by improving the quality of the generated content based on user feedback. The quality of generated image and/or video data is improved based on modifying the image and/or video data based on user interaction. The quality of the generated content is tailored specifically to the user by using reinforcement learning from human feedback. For example, by using more content-relevant data, the system improves the performance of generative models. Additionally, the system utilizes better training techniques by developing more efficient and effective training techniques that are specific to the user (e.g., based on reinforcement learning from human feedback) to reduce the time and resources required to train models. In some instances, the machine-learned model can be trained using user interaction data. For example, the user interaction data can include data from the user interacting with the generated image and/or video. Moreover, the system can incorporate user feedback and provide the feedback, via reinforcement learning or active learning, to generative models that can help the models learn from user preferences and improve over time. Furthermore, the present disclosure can reduce processing by reducing the number of manual inputs provided by a user and by reducing the number of interface screens which must be obtained, loaded, interacted with, and updated.

Additionally, the request image and/or video data is provided faster to the user by reducing the number of interactions with the user. For example, based on user interaction with the generated data, the system can dynamically update the generated content so that the user can obtain the correct results, which reduces the number of responses provided to a user until the user is satisfied with the response.

Another technical effect and benefit relate to improved computational efficiency and improvements in the functioning of a computing system. For example, the systems and methods disclosed herein can leverage the machine-learned models to provide more comprehensive results to a user that are tailored specifically to the user. Thus mitigating the use of additional input from a user, which can save time, processing resources, energy, and computational power. Moreover, the generated content can be dynamically updated based on user interaction, thus a user can find the right solution without requiring additional content generation.

With reference now to the Figures, example embodiments of the present disclosure will be discussed in further detail.

Example Devices and Systems

FIG. 1A depicts a block diagram of an example computing system 100 that dynamically generates content according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models 120 can be received from the server computing system 130 over network 180, stored in the user computing device memory 114, and then used or otherwise implemented by the one or more processors 112.

Additionally or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2A-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

In particular, the models 120 and/or 140 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

The models 120 and/or 140 can include a single or multiple instances of the same model configured to operate on data from input(s). The models 120 and/or 140 can include an ensemble of different models that can cooperatively interact to process data from input(s). For example, the models 120 and/or 140 can employ a mixture-of-experts structure.

Input(s) can generally include or otherwise represent various types of data, such as a user request that include natural language text data. Input(s) can include one type or many different types of data. Output(s) can be data of the same type(s) or of different types of data as compared to input(s). Output(s) 720 can include one type or many different types of data, such as image data and/or video data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

Example data types for output(s) can include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

In particular, the model trainer 160 can train the models 120 and/or 140 based on a set of training data 162.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

The models 120 and/or 140 can be a machine-learned model that is tailored to a specific user by being trained based on data associated with the user. In some instances, the data associated with the user can be proprietary data and only used to train a model that only the user has access to. Moreover, the models 120 and/or 140, being trained with user data, can provide answers that are more accurate in comparison to a fine-tuned general model. Moreover, one or more parameters of the models 120 and/or 140 can be updated using reinforcement learning with Human Feedback (RLHF) data. The RLHF data can include user feedback data, and other user data. The user feedback data can include acceptance or rejection of suggestions proposed by the model. The RLHF data can be used for offline training of the models 120 and/or 140.

Furthermore, the models 120 and/or 140 can be trained based on user data and only used by the user, thus ensuring that sensitive information of the user is used solely for the purposes of the user. The sensitive information of the user may not be used for the training of a general large language model.

The training of models 120 and/or 140 can include obtaining a training instance having user data and reinforcement learning from human feedback (RLHF) data. A set of training data can include user data and RLHF data. The set of training data can include a plurality of training instances divided between multiple datasets (e.g., a training dataset, a validation dataset, or testing dataset). A training instance can be labeled or unlabeled. Although referred to a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

Additionally, the training of models 120 and/or 140 can include processing, using the models 120 and/or 140, the training instance to generate an output. The output can be directly obtained from the models 120 and/or 140 or can be a downstream result of a chain of processing operations that includes an output of the models 120 and/or 140.

Moreover, the training of models 120 and/or 140 can include receiving an evaluation signal associated with the output. The evaluation signal can include RLHF data. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s). The feedback data can include RLHF data.

Subsequently, the training of models 120 and/or 140 can include updating the models 120 and/or 140 using the evaluation signal. For example, values for parameters of the machine-learned model(s) can be learned, in some embodiments, using various training or learning techniques, such as, for example, backwards propagation. For example, the evaluation signal can be back propagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example methods can include implementing a number of generalization techniques (e.g., weight decays, dropouts, etc.) to improve the generalization capability of the models being trained.

In some implementations, example training techniques can be implemented for particular stages of a training procedure, such as pre-training. Pre-training can include, for instance, large-scale training over potentially noisy data to achieve a broad base of performance levels across a variety of tasks/data types. In some implementations, example methods can be implemented for fine-tuning models 120 and/or 140. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on RLHF data, such as user feedback on model performance during use.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
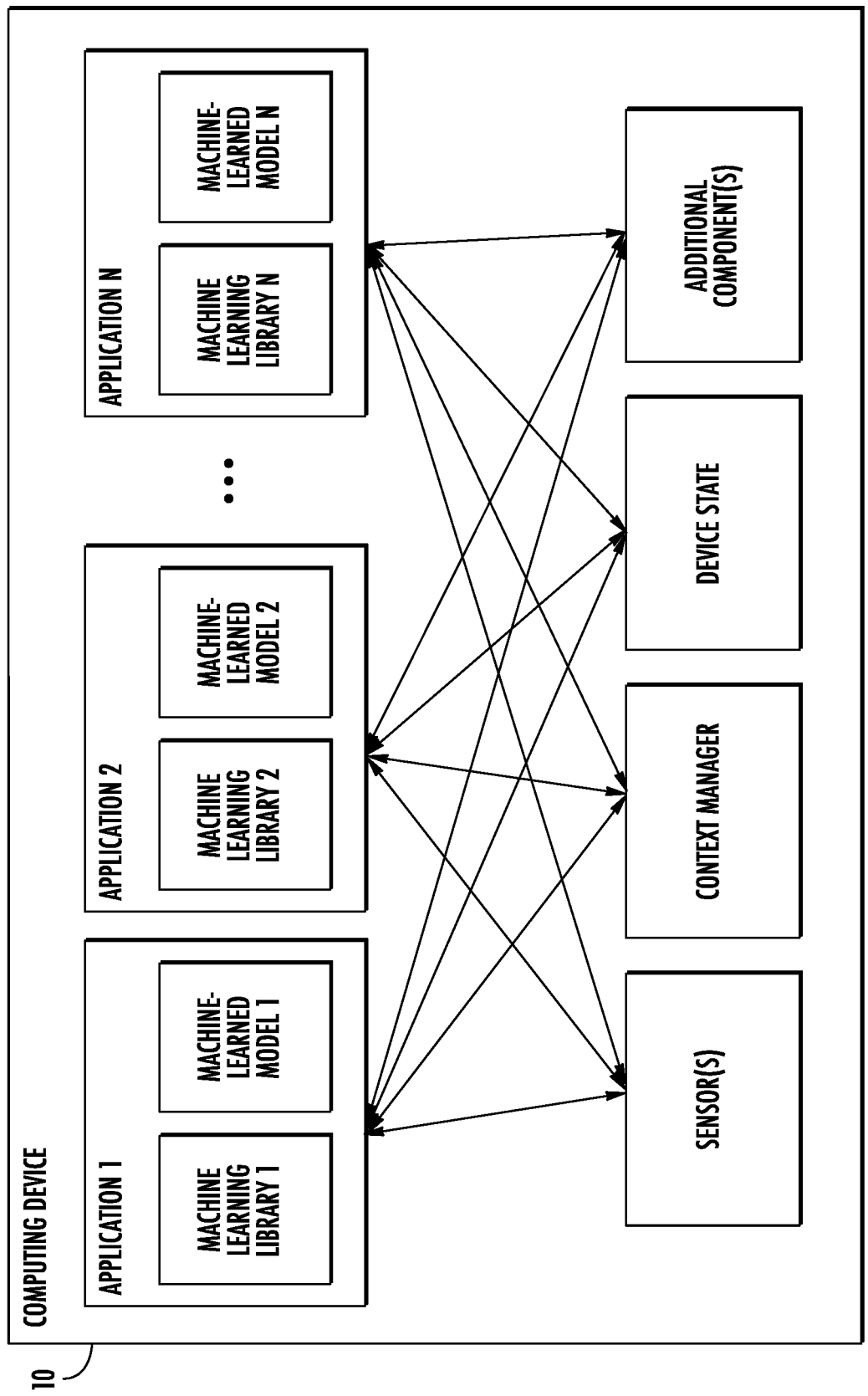
FIG. 1B depicts a block diagram of an example computing device that generates dynamic content according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
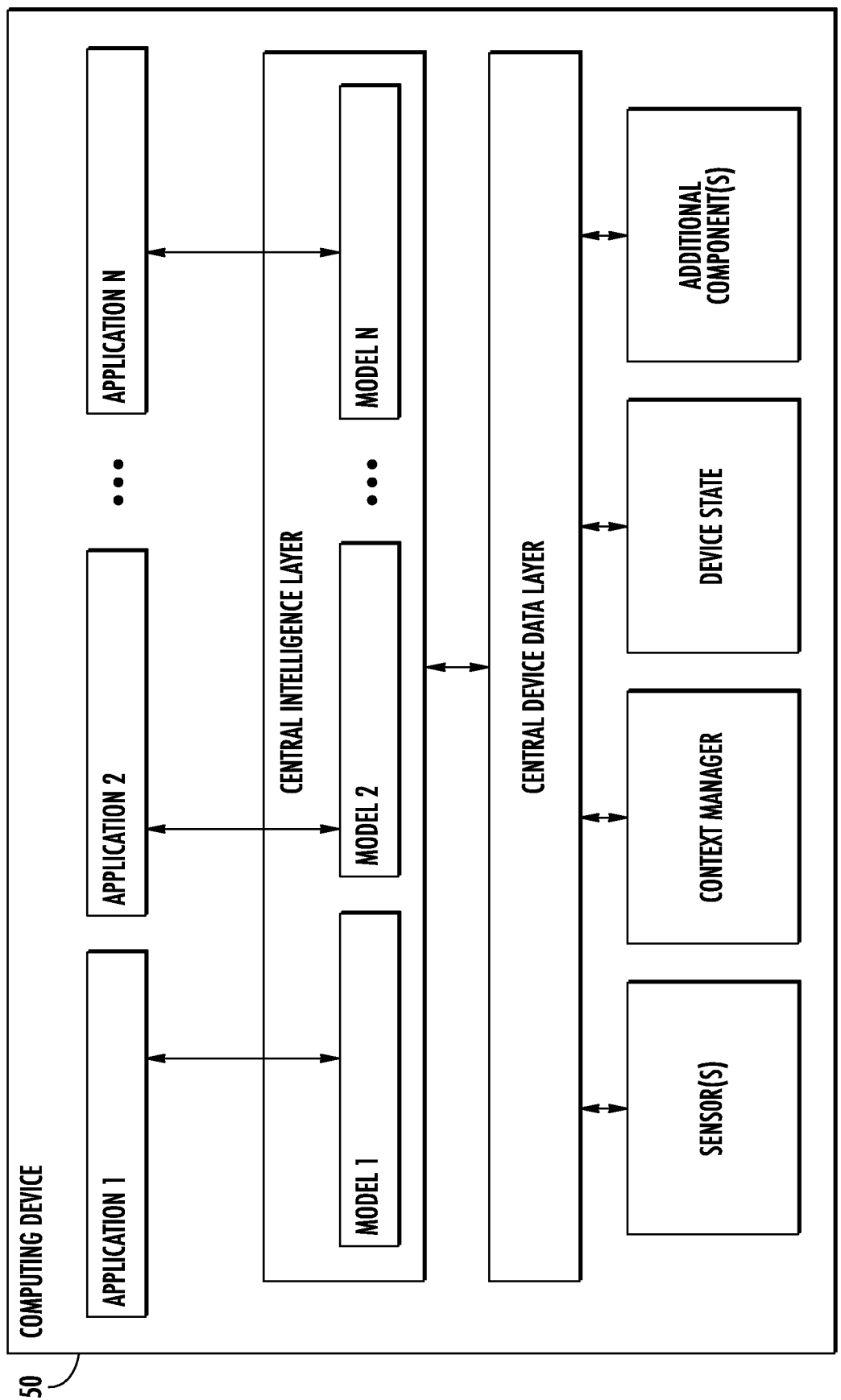
FIG. 1C depicts a block diagram of an example computing device that generates dynamic content according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example User Interfaces

The techniques described herein can be used in a variety of applications. The techniques can include defining a user interface in concert with the generation of the content itself by a model.

Figure 2A:
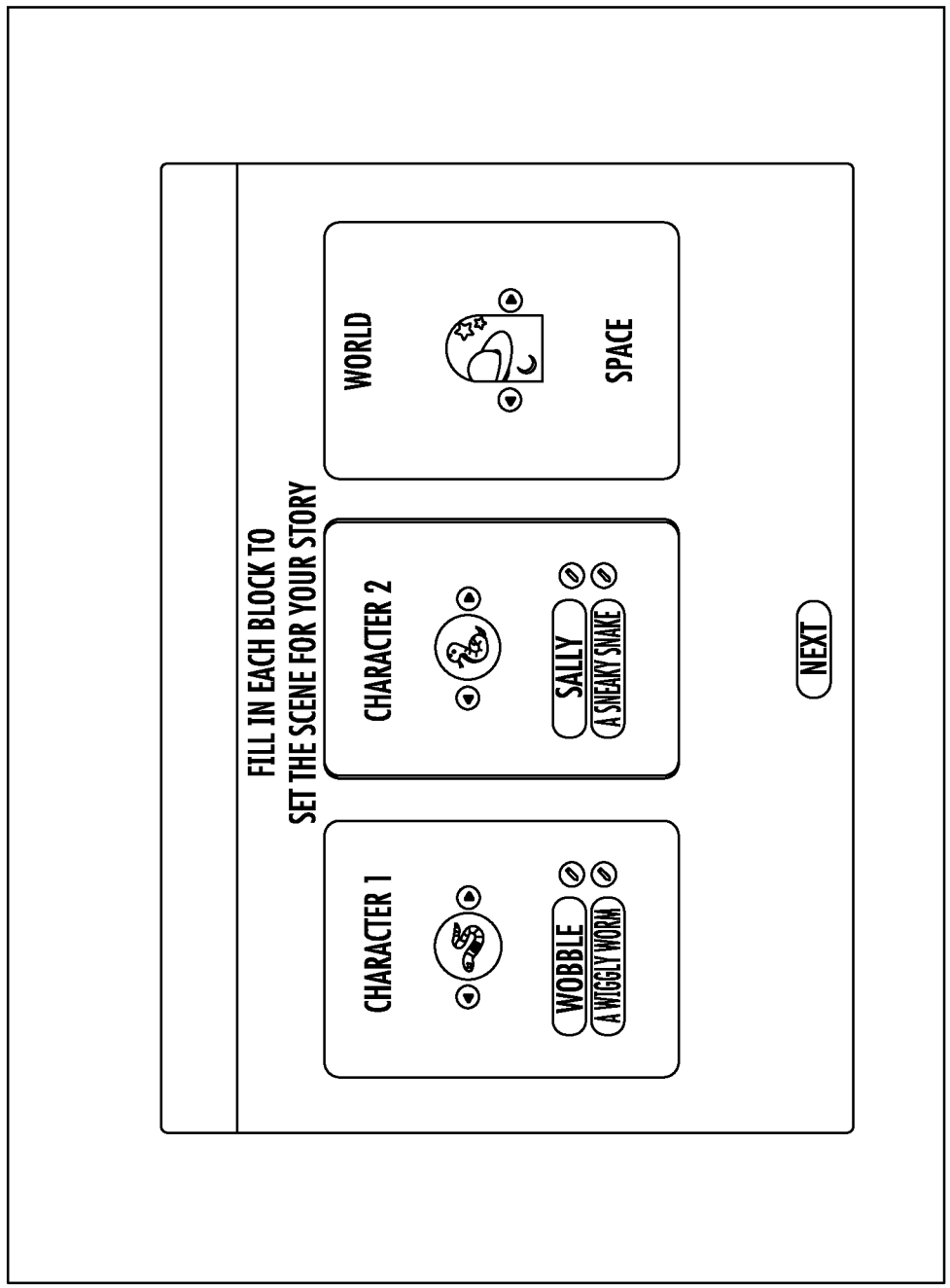

FIG. 2A can be used as an example for detailing the concept. As illustrated in FIG. 2A, the initial parameters of content generation are defined by the user in the first screen of the application. In this example, the generated content can be the same type (e.g., class). The model can alter the generated input based on user input (e.g., user feedback). For example, the user is later able to alter the generated content based on user input. The user input can include model-dictated elements of the interface (character, setting).

Figure 2B:
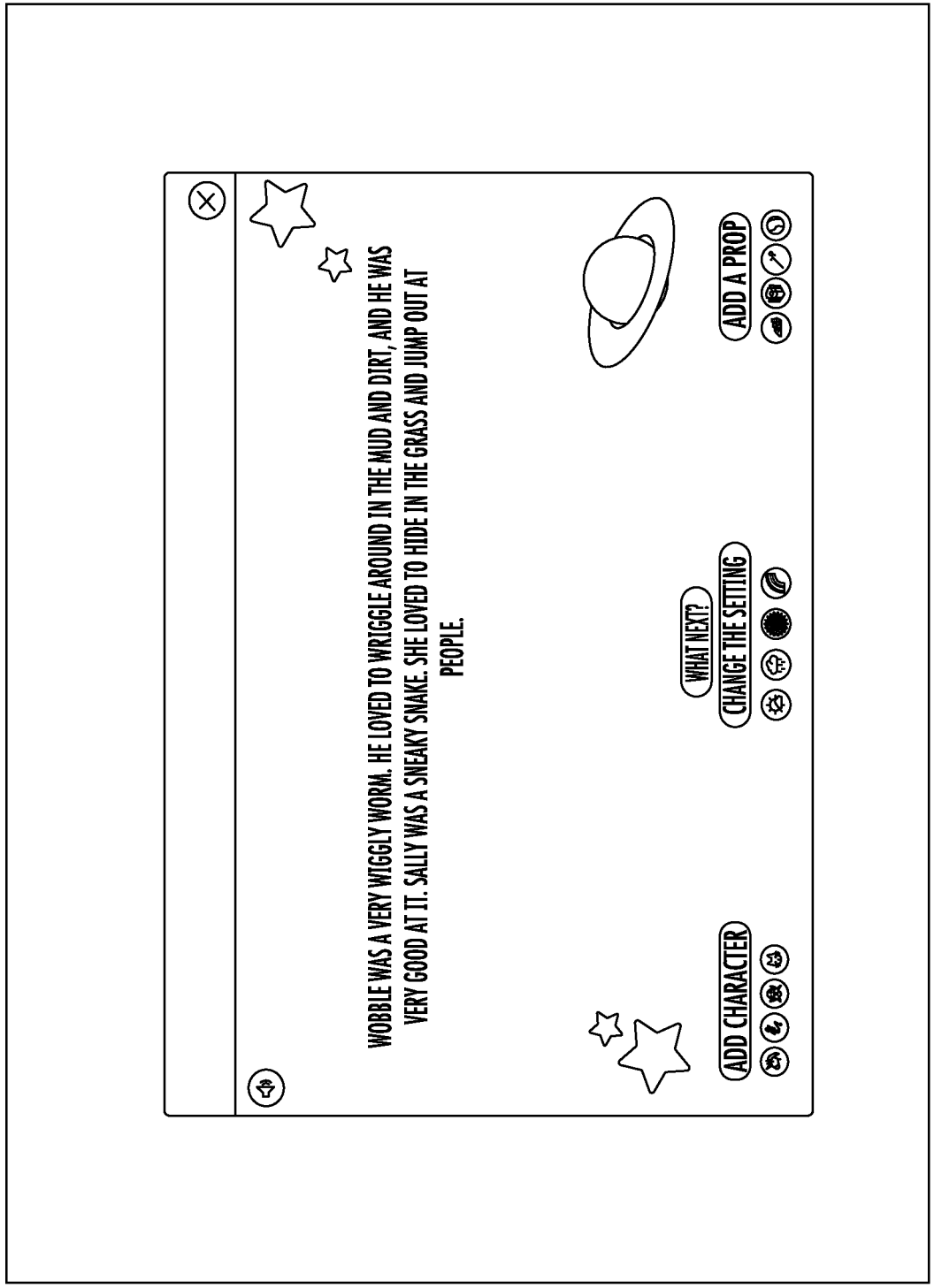

As illustrated in FIG. 2B, the generated content (e.g., storybook) can consist of consecutive pages of a generated story. In some instances, the consecutive pagers may not be generated simultaneously, but through a user-interactive, iterative process of creation. The user is able at each page to choose from a range of story element (e.g., characters, settings, and props). The user include can include a selection of a story element that can trigger further iteration of the generated story. In one example, these story element can be represented by emojis. In another example, the story element can be text labels, icons chosen from a repository, or other medium-appropriate interface element.

As illustrated in FIG. 2B, these are dynamically selected by the generative system to match the copy. In this example, the model has suggested a selection of alternate props and characters to match the story, which has of course itself been dynamically generated.

As illustrated in FIG. 2C, in this example, the model can generate a story line that is based on text domain. Additionally, the story can include a predetermined set of interface options from which the model and/or user can select. With this technique, the user interfaces can be generated either: semi-autonomously or fully dynamically. For example, the semi-autonomously generated content can be generated by fuzzily matching to a set of predefined interface choices dictated by the application creator. Additionally, the fully dynamically generated content can be generated with interface components generated on the fly (e.g., extending the example with word-label choices, rather than the predefined emoji palette).

Furthermore, the technique can be extended into other media than text. For example, the content of a generative visual scene can include interface elements pertaining to individual objects of the picture that are extracted through use of image analysis models (e.g. content (such as trees, water, people) or style classification (such as photo, painting, illustration)). The potential actions to perform on an object can include simple or complex controls (e.g., deleting an entity in a scene, exerting a specific change over an entity such as multiplying, or changing its color (the adjustable properties in this case being offered dynamically)). According to some embodiments, as illustrated in FIG. 3A, the concept example of this technique in the context of image generation to illustrate its application in a non-text medium.

Figure 3A:
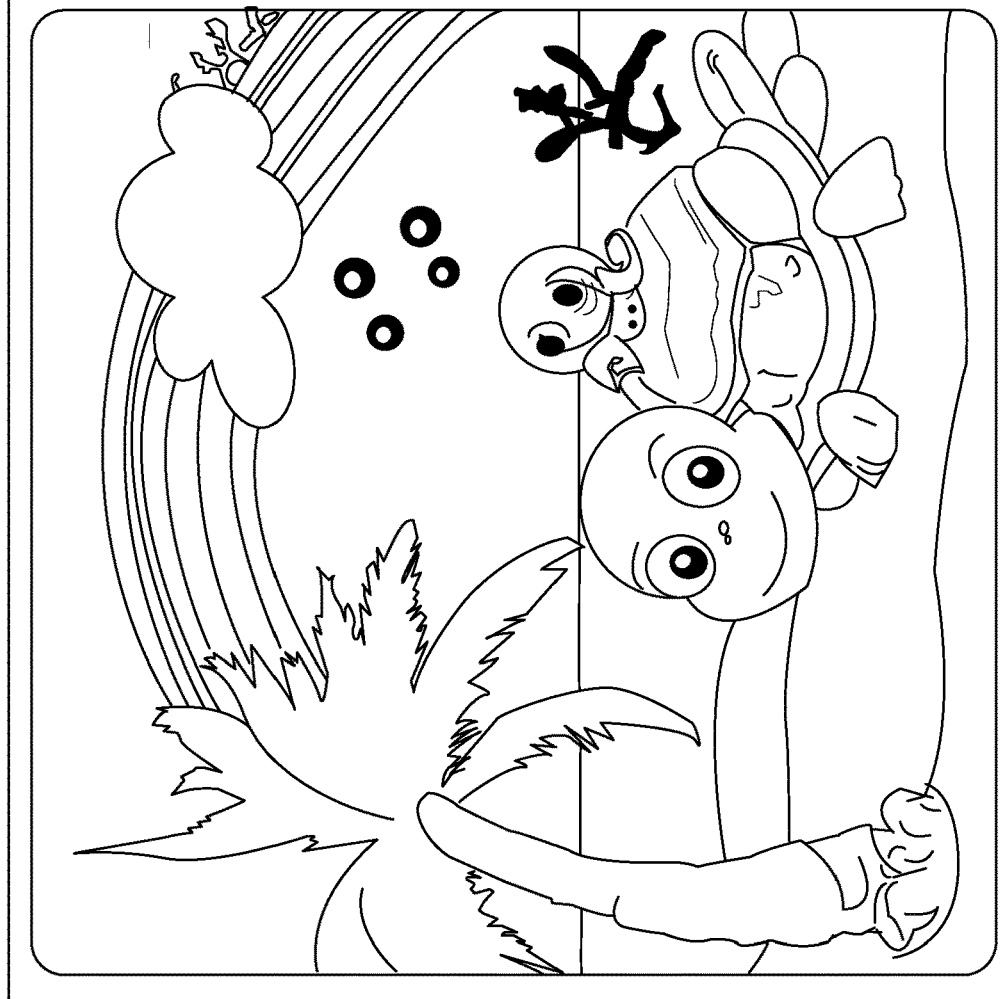
FIGS. 3A-3D depicts diagrams of an example user interface according to example embodiments of the present disclosure.

In FIG. 3A, according to a first example embodiment, a user can request for the generation of an illustration of "a happy turtle and an octopus on the beach with a rainbow in the background." The user request can be received by the system using a standard prompt-based interface.

Figure 3B:
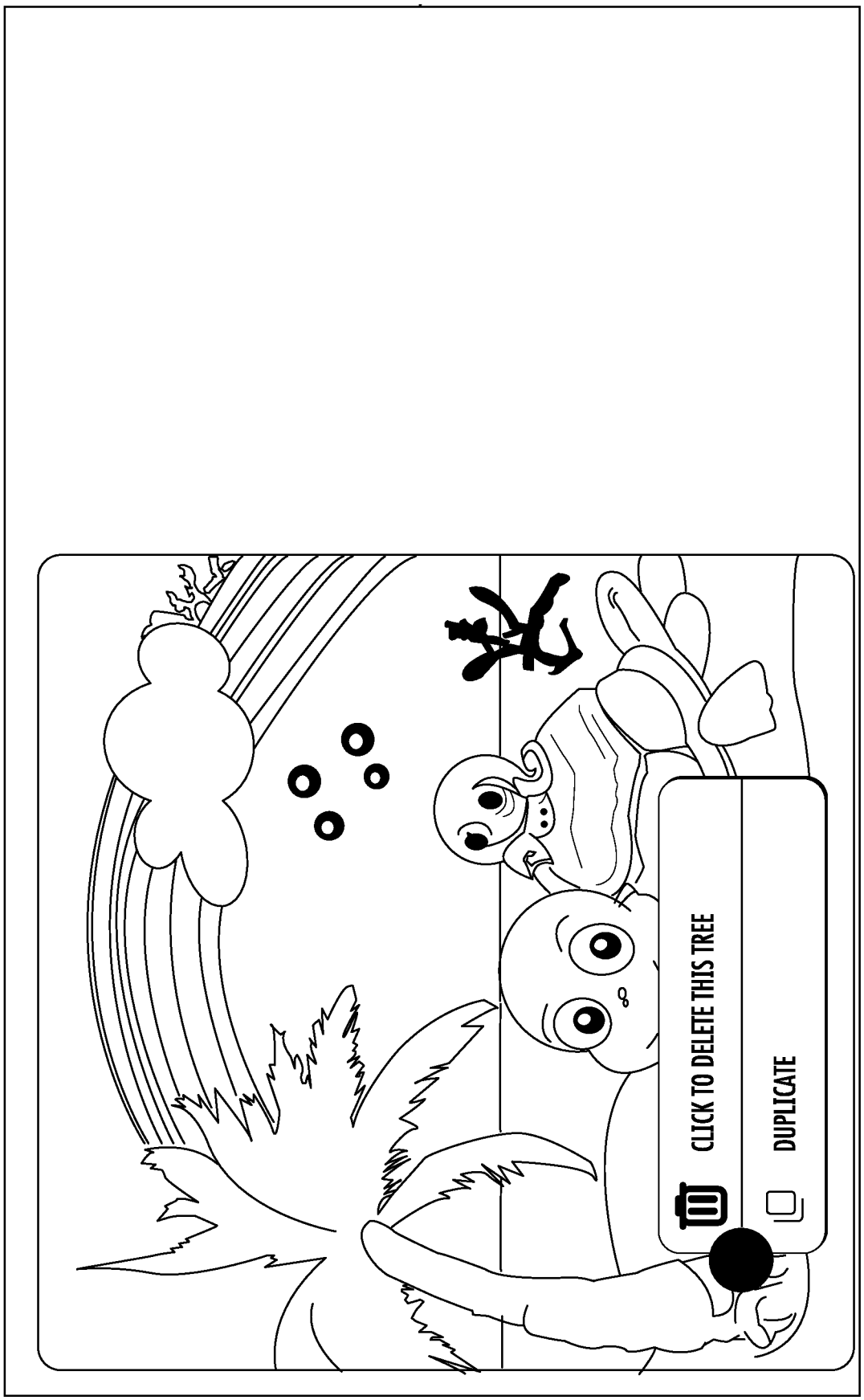

In FIG. 3B, continuing with the first example, the system can parse the contents of the image to detect one or more objects. The system can map the detected objects to interface options. Additionally, the system can present the options associated with each object to a user when a user selects or hovers over the specific object. In this example, the options available for a foreground entity in an image are presented. As illustrated, the user can delete or duplicate the object (e.g., tree). The options to modify the object can be determined by the models 120 and/or 140 based on characteristics of the object.

Figure 3C:
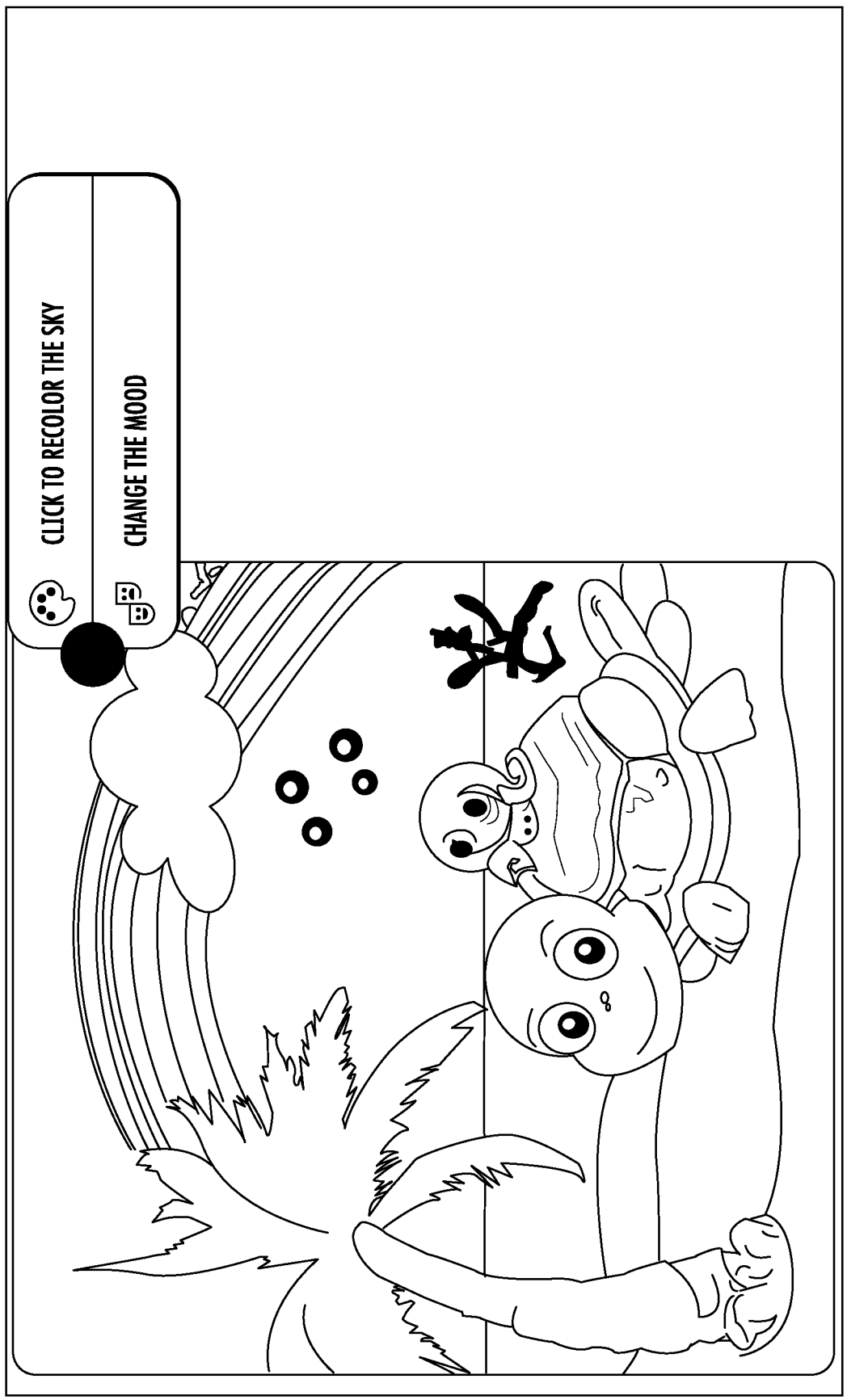

In FIG. 3C, continuing with the first example, the system can present different actions (e.g., options) when a user selects a different object (e.g., the background element). In this example, the system can present a different set of options to the user. The system can determine that the background cannot be deleted but can be recolored and/or modify based on a mood.

Figure 3D:
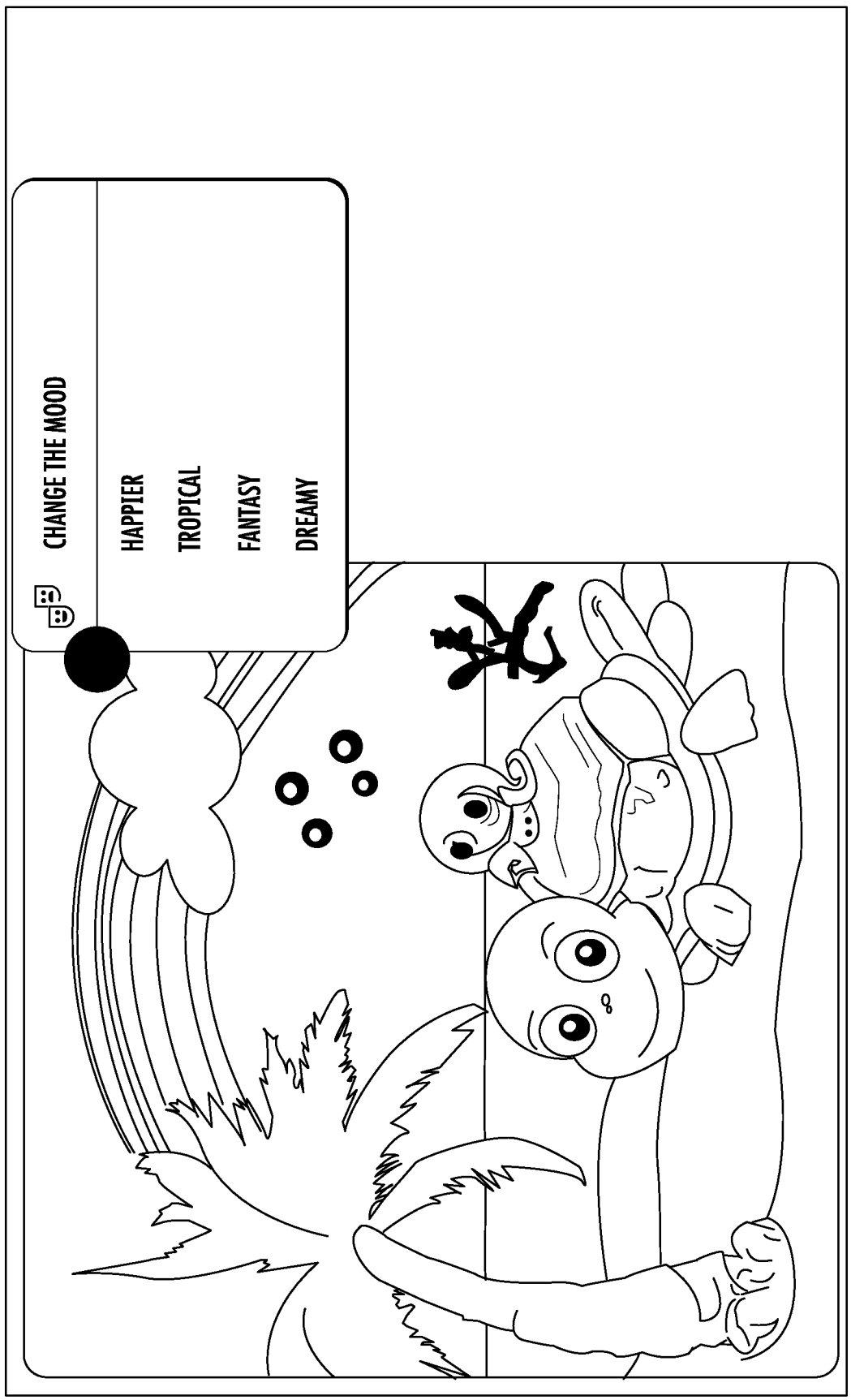

In FIG. 3D, continuing with the first example, the system can present different sub-actions (e.g., sub-options) when a user selects an options associated with the object. For example, when a user selected to change the mood of the background object, then the system can present sub-actions. The sub-actions can be dynamically created based on the style and content of the image in order to be relevant to the image. In this first example, the sub-actions can include happier, tropical, fantasy, or dreamy mood sub-options.

The options and/or sub-options can be determined by the system based on various detected features of the image and/or selected object. For example, when the image is associated with a captured photograph, the options can include lighting options, which would not be applicable to a children's illustration as highlighted in the first example. The children illustration can have different options such as a user ability to change the mood of the story.

FIGS. 4A-4D depict illustrations according to another example embodiment. IN this example, the illustrations highlight the system's ability to generate images in an iterative process.

Figure 4A:
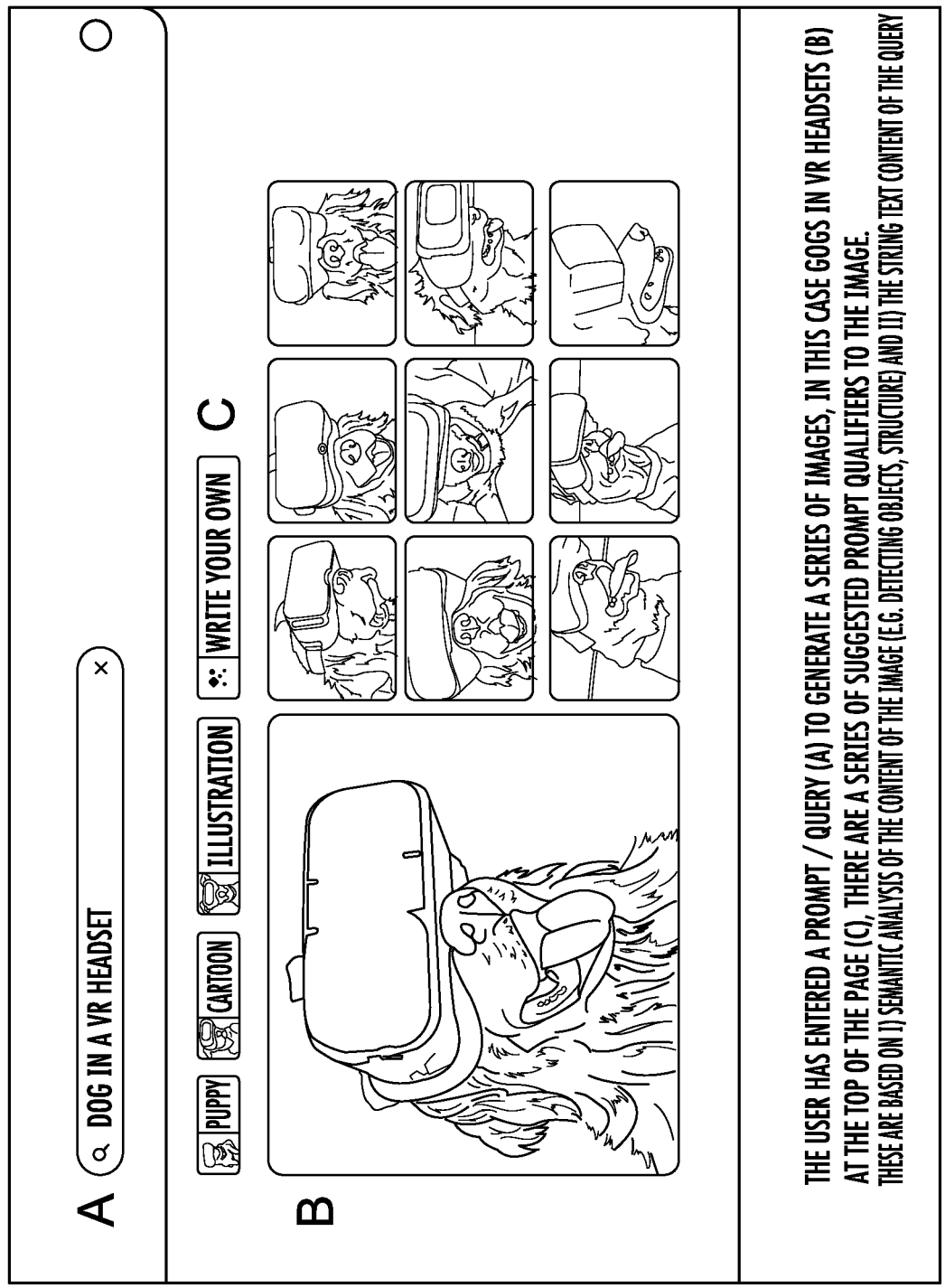
FIG. 4A-4D depicts diagrams of an example user interface according to example embodiments of the present disclosure.

In FIG. 4A, the user has entered a prompt (e.g., query A) to generate a series of images. In this example, the generated images are of dogs in VR headset (B). At the top of the page (C), there are a series of suggested prompt qualifiers to the image. The prompt qualifiers are based on i) semantic analysis of the content of the image (e.g., deleting objects, structure); and/or ii) the string text content of the query.

Figure 4B:
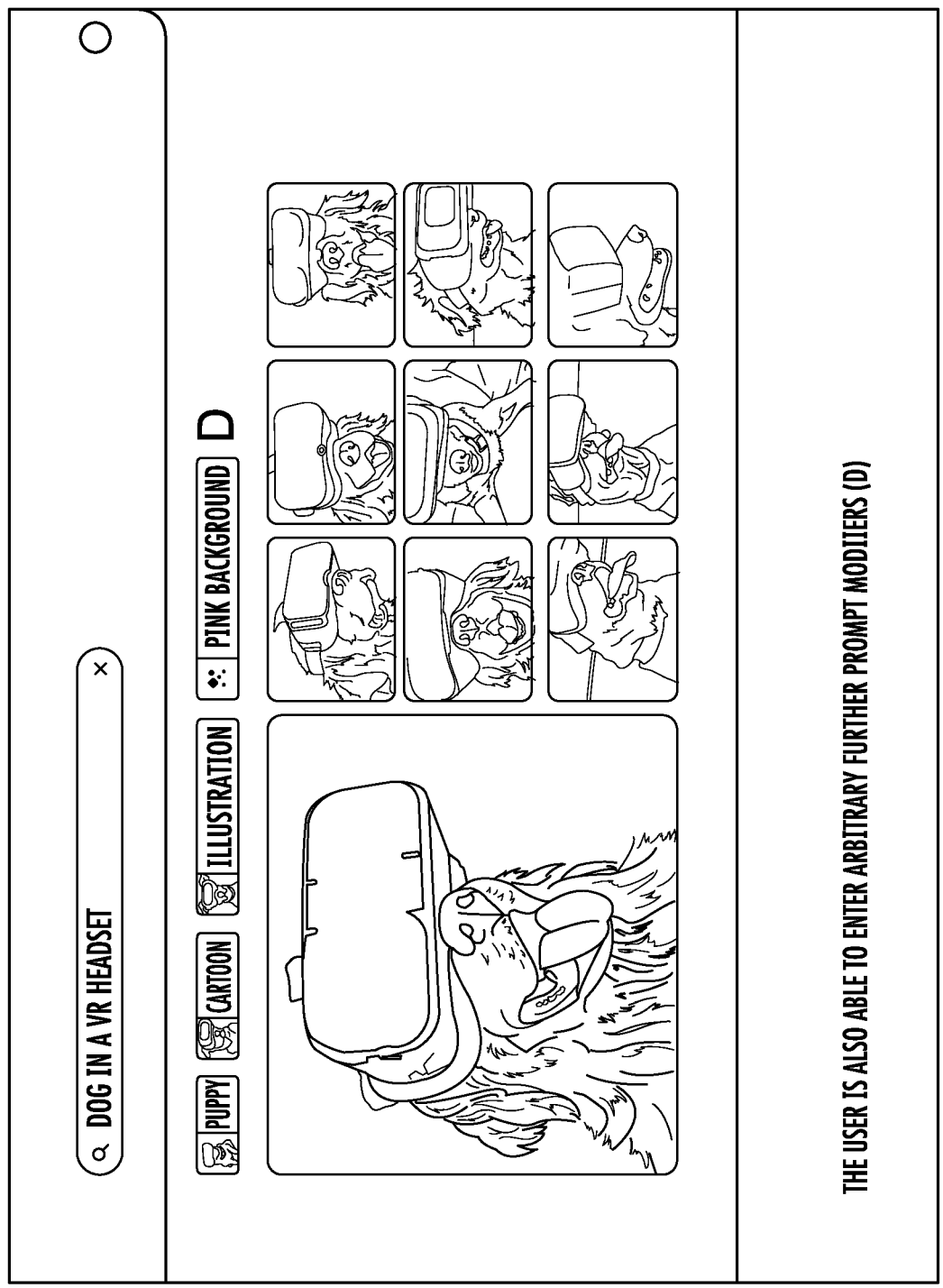

In FIG. 4B, the user is also able to enter arbitrary further prompt modifiers (D). For example, the user can prompt to modify the image by changing the background to a pink color.

Figure 4C:
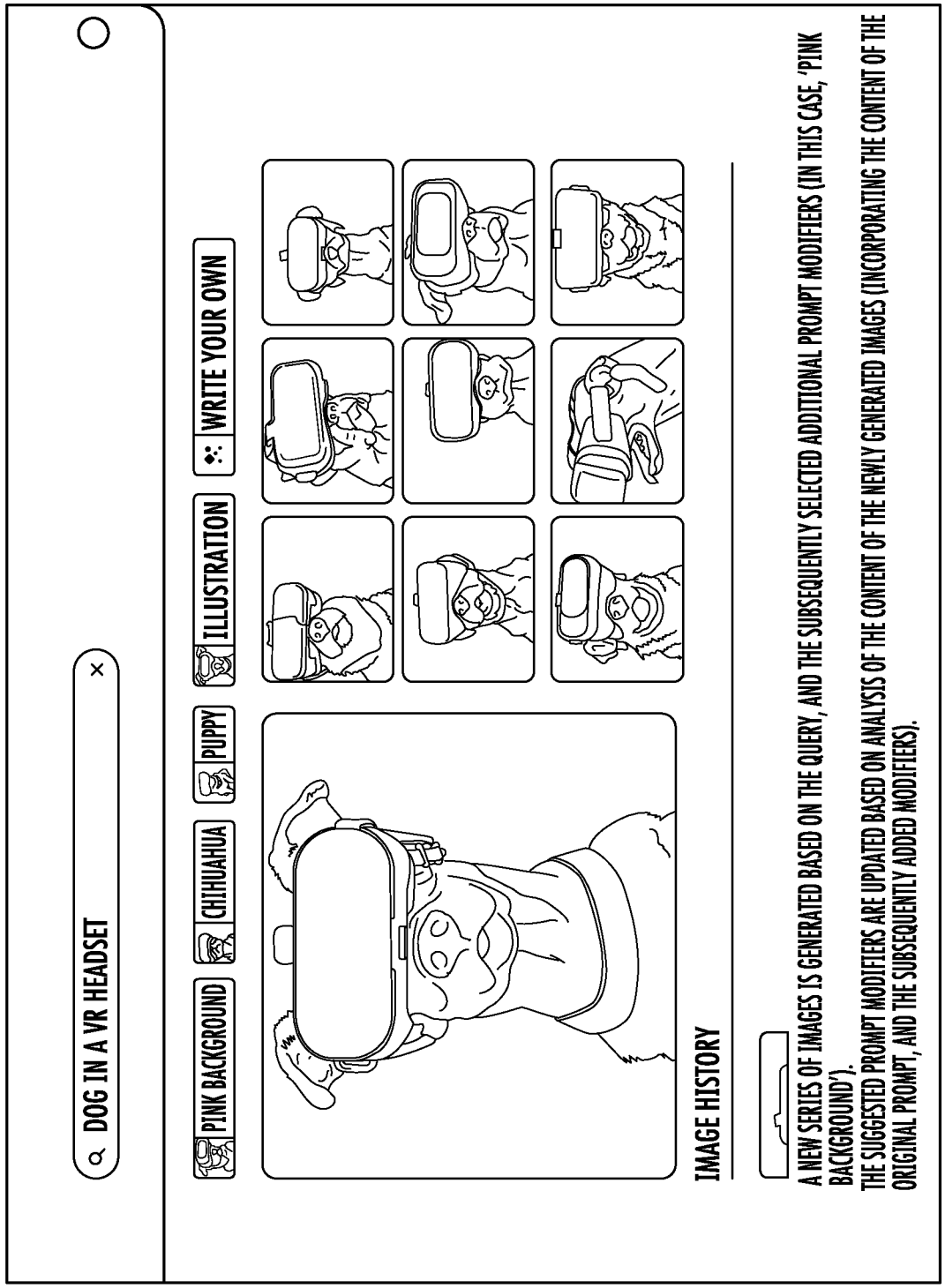

In FIG. 4C, a new series of images is generated based on the query, and the subsequently selected additional prompt modifiers (e.g., in this case "pink background"). Moreover, the suggested prompt modifiers are updated based on analysis of the content of the newly generated images (incorporating the content of the original prompt, and the subsequently added modifiers).

Figure 4D:
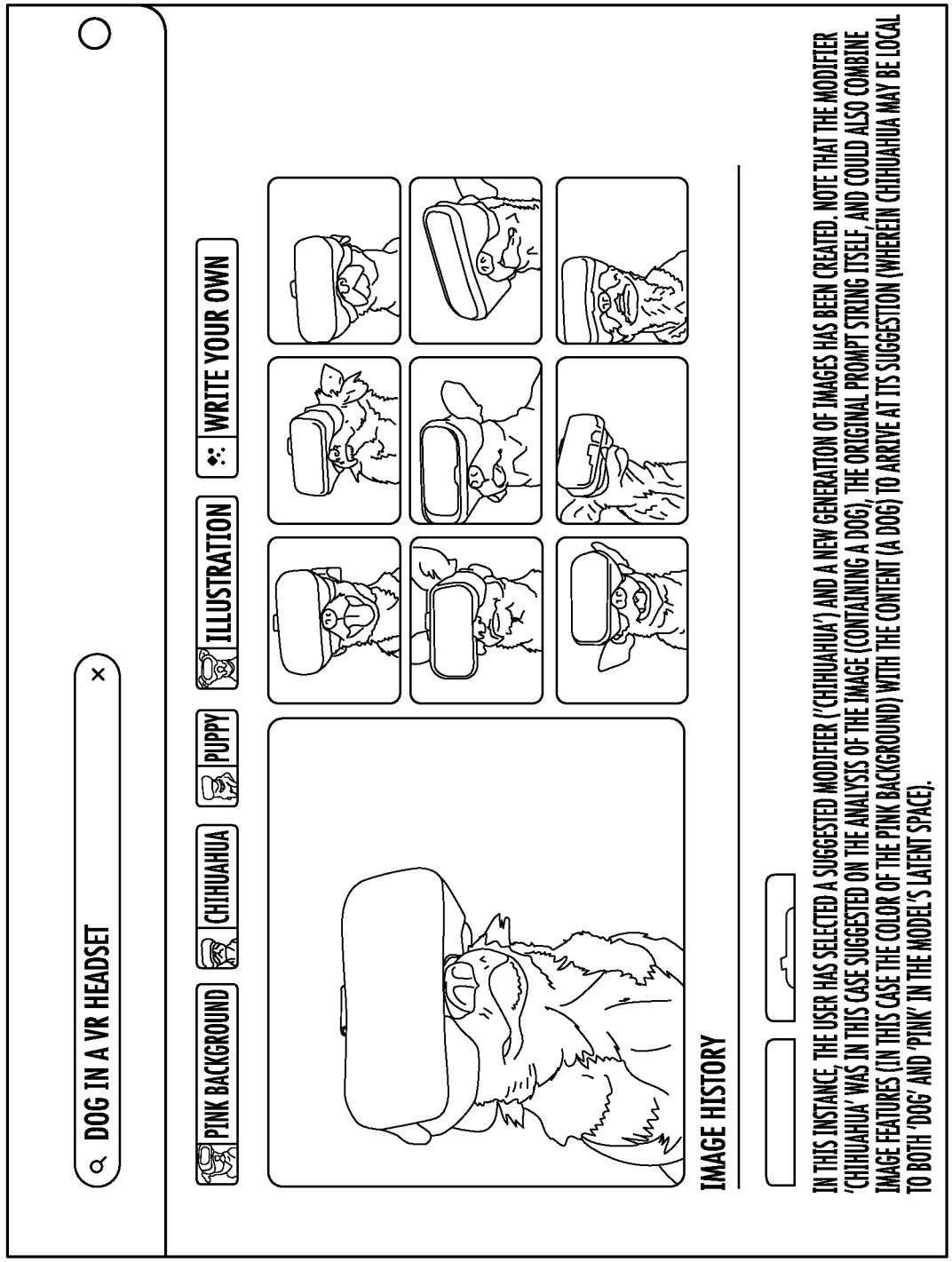

In FIG. 4D, in this instance, the user can select a suggested modifier (e.g., 'chihuahua') and a new generation of images can be created by the system. The system can determine and suggest the modifier 'chihuahua' based on the analysis of the image (e.g., containing a dog) and/or the original prompt string itself. Additionally, the system can combine image features (in this case the color of the pink background) with the content (a dog) to arrive at its suggestion (wherein chihuahua may be local to both 'dog' and 'pink' in the model's latent space).

Example Methods

Figure 5:
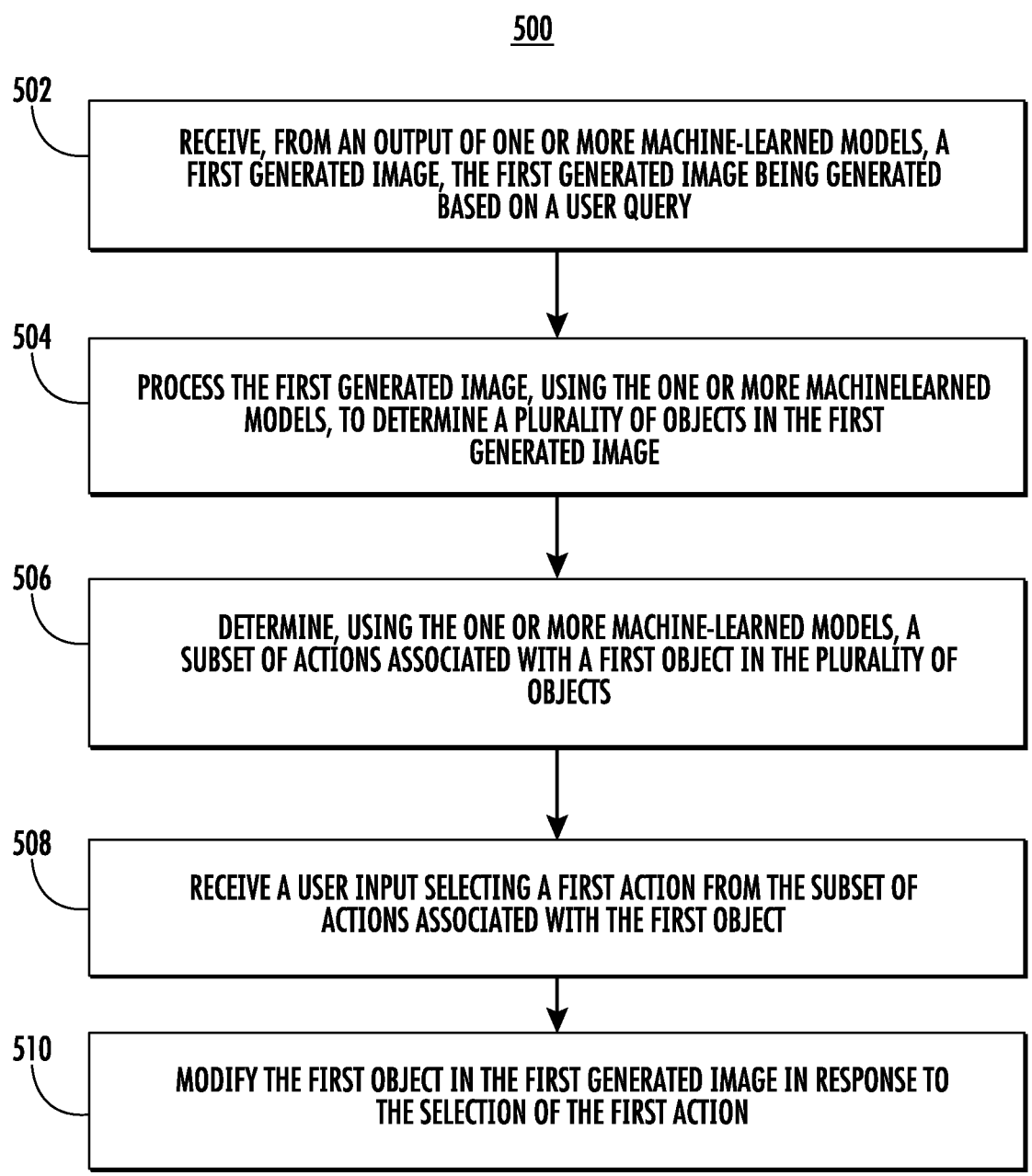
FIG. 5 depicts a flow chart diagram of an example method to generate dynamic content according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

At 502, a computing system (e.g., system 100, computing device 10, computing device 50) can receive from an output of one or more machine-learned models a first generated image. The first generated image can be generated based on a user query. For example, the user can prompt the system 100 having models 120 and/or 140 to generate an image of a dog with a VR headset, as illustrated in prompt A of FIG. 4A. The models 120 and/or 140 can generate the image B in FIG. 4A.

At 504, the computing system can process the first generated image, using the one or more machine-learned models (e.g., models 120, models 140), to determine a plurality of objects in the first generated image. For example, in the children's illustration of FIGS. 3A-3D, the system can determine the plurality of objects in the image. The plurality of objects can include the palm tree, the turtle, the background, the rainbow, and so on.

At 506, the computing system can determine, using the one or more machine-learned models, a subset of actions associated with a first object in the plurality of objects. Continuing with the children's illustration of FIGS. 3A-3D, the system can determine that the subset of actions associated with the tree is to either delete the tree or duplicate the tree in FIG. 3B. Additionally, the system can determine that the background can be recolored, or the mood can be changed in FIG. 3C.

In some instances, when a user selects an object, and then selects an option associated with the object, the system can determine sub-options for the object based on the content of the image, the selected object, the selected option associated with the option, or previous user interactions with the image and/or object.

At 508, the computing system can receive a user input selecting a first action from the subset of actions associated with the first object. For example, the system can modify a first image based on the selected first action. Additionally, the first image can be associated with a plurality of images as part of a story. Moreover, the system can modify one or more images in the plurality of images based on the selected first action.

At 510, the computing system can modify the first object in the first generated image in response to the selection of the first action.

In some instances, the computing system can modify a second generated image in response to the selection of the first action, the second generated image being associated with the first generated image. For example, the second generated image can be part of a story that is associated with the first generated image, and when the system modifies the first object in the first generated image, the system can also modify the first object in the second generated image, the third generated image, and so on.

In some instances, the computing system can present the subset of actions that can be performed to the first object in response to a selection of the first object.

In some instances, the computing system can select the subset of actions from a larger set of actions based on a ranking score of each action in the larger set of actions. The ranking score can be based on user interactions with the object or similar objects.

In some instances, the subset of actions is being determined based on a characteristic of the first object.

In some instances, the generated image is generated by a machine-learned image generation model.

In some instances, the plurality of objects in the generated image are determined by a machine-learned image segmentation model. In some instances, the machine-learned image segmentation model is a generative adversarial network (GAN) model that processes the first generated image to determine the first object.

In some instances, a parameter of the one or more machine-learned model is modified based on the user input. For example, the generated content can be tailored specifically to the user by using reinforcement learning from human feedback. The machine-learned model 120, 140 can be trained using user interaction data. For example, the user interaction data can include data from the user interacting with the generated image and/or video. Moreover, the system can incorporate user feedback and provide the feedback, via reinforcement learning or active learning, to generative models that can help the models learn from user preferences and improve over time

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method to generate dynamic content, the method comprising:
receiving, from an output of one or more machine-learned models, a first generated image, the first generated image being generated based on a user query;
processing the first generated image, using the one or more machine-learned models, to determine a plurality of objects in the first generated image;
determining, using the one or more machine-learned models, a subset of actions associated with a first object in the plurality of objects;
receiving a user input selecting a first action from the subset of actions associated with the first object; and
modifying the first object in the first generated image in response to the selection of the first action.

2. The method of claim 1, further comprising:
modifying a second generated image in response to the selection of the first action, the second generated image being associated with the first generated image.

3. The method of claim 1, further comprising:
presenting the subset of actions that can be performed to the first object in response to a selection of the first object.

4. The method of claim 1, further comprising:
selecting the subset of actions from a larger set of actions based on a ranking score of each action in the larger set of actions.

5. The method of claim 1, wherein the subset of actions is being determined based on a characteristic of the first object.

6. The method of claim 1, wherein the generated image is generated by a machine-learned image generation model.

7. The method of claim 1, wherein the plurality of objects in the generated image are determined by a machine-learned image segmentation model.

8. The method of claim 7, wherein the machine-learned image segmentation model is a generative adversarial network (GAN) model that processes the first generated image to determine the first object.

9. The method of claim 1, wherein a parameter of the one or more machine-learned model is modified based on the user input.

10. The method of claim 1, wherein the subset of actions is based on a semantic analysis, by the one or more machine-learned models, of content in the first generated image.

11. The method of claim 1, wherein the subset of actions is based on a string text content of the user query.

12. The method of claim 1, wherein the subset of actions includes deleting the first object.

13. The method of claim 1, wherein the subset of actions includes changing a color of the first object.

14. The method of claim 1, wherein the subset of actions includes moving the first object.

15. The method of claim 1, wherein the subset of actions includes changing a shape of the first object.

16. The method of claim 1, wherein the subset of actions includes changing a size of the first object.

17. The method of claim 1, wherein the subset of actions includes changing a characteristic of the first object.

18. The method of claim 1, further comprising:
in response to the selection of the first action from the subset of actions associated with the first object, determining, using the one or more machine-learned models, a plurality of sub-actions associated with the first action, the sub-actions being determined based on context of the first generated image, the first object, and the first action.

19. A computer system, the system comprising:
one or more processors; and
one or more non-transitory computer-readable media that collectively store instructions that, when executed by the one or more processors, cause the computing system to perform operations, the operations comprising:

receiving, from an output of one or more machine-learned models, a first generated image, the first generated image being generated based on a user query;

processing the first generated image, using the one or more machine-learned models, to determine a plurality of objects in the first generated image;

determining, using the one or more machine-learned models, a subset of actions associated with a first object in the plurality of objects;

receiving a user input selecting a first action from the subset of actions associated with the first object; and modifying the first object in the first generated image in response to the selection of the first action.

20. One or more non-transitory computer-readable media that collectively store instructions that, when executed by the one or more processors, cause a computing system to perform operations, the operations comprising:

receiving, from an output of one or more machine-learned models, a first generated image, the first generated image being generated based on a user query;

processing the first generated image, using the one or more machine-learned models, to determine a plurality of objects in the first generated image;

determining, using the one or more machine-learned models, a subset of actions associated with a first object in the plurality of objects;

receiving a user input selecting a first action from the subset of actions associated with the first object; and modifying the first object in the first generated image in response to the selection of the first action.

* * * * *